(12) United States Patent
Yuresko et al.

(10) Patent No.: US 10,873,855 B1
(45) Date of Patent: Dec. 22, 2020

(54) VIDEO CONFERENCING CONFIGURATION FOR HEALTHCARE PATIENT DEVICE

(71) Applicant: JAMF SOFTWARE, LLC, Minneapolis, MN (US)

(72) Inventors: Jonathan William Yuresko, Union, NJ (US); Adam Ihsan Mahmud, Saint Paul, MN (US); Timothy Carleton Knox, Saint Paul, MN (US); David Benjamin Raabe, Minneapolis, MN (US)

(73) Assignee: JAMF SOFTWARE, LLC, Minneapolis, MN (US)

( * ) Notice: Subject to any disclaimer, the term of this patent is extended or adjusted under 35 U.S.C. 154(b) by 0 days.

(21) Appl. No.: 16/875,449

(22) Filed: May 15, 2020

(51) Int. Cl.
*H04W 12/06* (2009.01)
*G06F 21/45* (2013.01)

(52) U.S. Cl.
CPC ............ *H04W 12/06* (2013.01); *G06F 21/45* (2013.01); *H04W 12/0602* (2019.01); *H04W 12/0605* (2019.01); *H04W 12/0608* (2019.01); *H04W 12/0609* (2019.01)

(58) Field of Classification Search
CPC .................................................. H04W 12/06
See application file for complete search history.

(56) References Cited

U.S. PATENT DOCUMENTS

| | | | |
|---|---|---|---|
| 7,185,282 B1* | 2/2007 | Naidoo | A61B 5/0002 348/E7.071 |
| 7,613,620 B2* | 11/2009 | Salwan | G16H 40/20 705/2 |
| 8,224,667 B1* | 7/2012 | Miller | G06Q 50/24 705/2 |
| 10,325,070 B2* | 6/2019 | Beale | G06Q 10/0637 |
| 10,694,144 B2* | 6/2020 | Shaya | G06Q 50/22 |

* cited by examiner

*Primary Examiner* — Bradley W Holder (57) ABSTRACT

A method includes receiving an indication that a patient is assigned to a patient device. The patient device stores healthcare information associated with the patient. The method includes sending configuration data to the patient device to configure the patient device to be compatible with a video conference service in response to receiving the indication that the patient is assigned to the patient device. The method includes generating video conference credentials for the patient in response to configuring the patient device. The video conference credentials enable an auto join link that is usable by a third party device to establish a video conference with the patient through the video conference service. The method includes sending the video conference credentials to the third party device.

17 Claims, 6 Drawing Sheets

VIDEO CONFERENCING CONFIGURATION FOR HEALTHCARE PATIENT DEVICE

I. FIELD

The present disclosure is generally related to mobile device management.

II. BACKGROUND

Healthcare facilities are increasingly finding ways to improve the patient experience. Typically, a patient physically enters into a healthcare facility and has an in-person consultation with a healthcare provider. However, in some scenarios, it may not be advisable for the patient to enter into the healthcare facility. As a non-limiting example, if the patient has been diagnosed with a highly contagious virus, the healthcare provider and other personnel at the healthcare facility could be at risk to contract the virus if the patient enters the healthcare facility for an in-person consultation with the healthcare provider. In this scenario, the patient could use different communication outlets to remotely consult with a healthcare provider. However, typical communication outlets require an extensive setup process, such as software configuration, a meeting code, a password, etc.

III. SUMMARY

Systems and methods of configuring a patient device for video conferencing services are disclosed. As used herein, patient devices, or "healthcare patient devices," are mobile devices assigned to patients by a healthcare facility for use at a remote location (e.g., a patient home) or mobile devices assigned to patients for use within the healthcare facility. For example, the patient devices include, without limitation, mobile phones, tablets, laptops, etc. Each patient device has a device identifier (ID) that is used by the healthcare facility to track which patient device is assigned to which patient. For example, the healthcare facility can store a data log with multiple entries. In this example, a first entry can include a first patient name and a first device ID corresponding to a first patient device, a second entry can include a second patient name and a second device ID corresponding to a second patient device, etc. In the above example, the first patient is assigned the first patient device and the second patient is assigned the second patient device. As used herein, "healthcare facility" can also correspond to a healthcare provider device located at the healthcare facility. For example, the data log with the multiple entries can be stored at a healthcare provider device (e.g., a computer (e.g. a desktop, a laptop, or a computer server) at the healthcare facility or at a remote site but managed by a computer at the healthcare facility (e.g. a virtual computer server in the cloud).

The healthcare facility device is configured to send an indication to a mobile device management (MDM) server that the first patient device is assigned to the first patient. To illustrate, the healthcare facility device can send the first device ID and a patient ID of the first patient to the MDM server. The patient ID can be a name of the first patient, the last four digits of the first patient's social security number, a birthdate of the first patient, any other identifying information associated with the first patient, or a combination thereof. Upon assigning the first patient device to the first patient, the healthcare facility can ship the first patient device to the first patient for use if the first patient is not within the healthcare facility. If the first patient is located within the healthcare facility, the first patient device can be assigned to a room of the first patient.

In response to receiving the first device ID and the patient ID from the healthcare facility, the MDM server is configured to prompt the first patient to enter healthcare information associated with the first patient. For example, the MDM server can configure the first patient device such that a "shortcut" to a healthcare application is presented on a home screen of the first patient device. Upon opening the healthcare application, the first patient may be prompted to enter healthcare information that is provided to the healthcare facility through a separate server (e.g., a healthcare facility server), such that the healthcare information is isolated from the MDM server for patient privacy. Thus, although the MDM server configures the first patient device to include the healthcare application (e.g., installs the healthcare application), all data sent through the healthcare application is isolated from the MDM server to ensure patient-provider confidentiality. The healthcare application can include several fields such that the first patient can insert answers to specific healthcare questions generated by a healthcare provider at the healthcare facility. In some implementations, the MDM server configures the first patient device such that the healthcare application is automatically opened (or activated) when the first patient device is turned on. As a result, the first patient can quickly and efficiently enter healthcare information into the healthcare application.

The MDM server is also configured to send configuration data to the first patient device to configure the first patient device to be compatible with a video conference service. For example, the configuration data can include a video conference service installation file that, when executed by a processor of the first patient device, installs the video conference service at the first patient device. The configuration data can be sent to the first patient device in response to the MDM server receiving notification that the first patient is assigned to the first patient device. The MDM server can also create a shortcut to the video conference service at the first patient device to enable the first patient to access the video conference service via a single click. For example, the MDM server can configure the first patient device such that the video conference service is presented on the home screen of the first patient device.

After the video conference service is installed at the first patient device, the MDM server generates video conference credentials for the first patient. The video conference credentials can correspond to a video conference code that is unique to the first patient and a password that is unique to the video conference code. Typically, any party wishing to enter into a video conference with the first patient through the video conference service would have to enter the video conference code and the password. However, according to the techniques described herein, the MDM server generates an auto join link that is included in the video conference credentials. When clicked, the auto join link enables a party to join the video conference associated with the video conference code without having to manually enter the video conference code and password. For example, the video conference code and the password are embedded into the auto-join link such that any party with access to the auto join link can join the video conference without having to enter the video conference code and the password. The MDM server presents the auto join link within the video conference service to alleviate the first patient from having to enter the video conference code and the password.

The MDM server is also configured to send the auto join link to a third party, such as the healthcare facility. In some implementations, the MDM server automatically sends the auto-join link to the healthcare facility. For example, when the MDM server receives the notification from the healthcare facility that the first patient device is assigned to the first patient, the MDM server sends the auto-join link to the same address that sent the notification. In other implementations, the first patient authorizes the MDM server to send the auto join link to the healthcare facility.

Thus, the healthcare provider (located at the healthcare facility) of the first patient can review the healthcare information of the first patient through the healthcare application and can consult with the first patient through the video conference service by clicking the auto join link, as opposed to having to enter the video conference code and the password. Because the auto join link is presented to the first patient in the video conference service, the first patient can also join the video conference with the healthcare provider without having to enter the video conference code and the password. As a result, the healthcare provider can easily provide a virtual consultation with the patient in scenarios where it is not be advisable for the first patient to enter into the healthcare facility. It should also be appreciated that the first patient can choose to send the auto join link to friends and family for virtual visits. Thus, in situations where the first patient is required to be quarantined at home or within the healthcare facility, the first patient can be virtually visited by friends and family without any party having to enter the video conference code and the password.

When the MDM server determines that the first patient is no longer assigned to the first patient device, the MDM server sends a reset command to erase all applications (e.g., the healthcare application and the video conference service) installed on the first patient device while the first patient device was assigned to the first patient. Additionally, the reset commands erases all data stored on the first patient device that was entered (by the first patient) while the first patient device was assigned to the first patient. Thus, the reset command indicates that personally identifiable information associated with the first patient, protected health information associated with the first patient, or both, is to be deleted from the first patient device. In some implementations, the reset command corresponds to a factory reset command and may indicate that all user data is to be deleted from the first patient device. The first patient device may delete the user data (e.g., including information associated with the first patient) in response to receiving the reset command. The MDM server can determine that the first patient is no longer assigned to the first patient device in response to receiving a message from the healthcare facility indicating as much.

In a particular aspect, a method includes receiving, at a mobile device management (MDM) server, an indication that a patient is assigned to a patient device. The patient device stores healthcare information associated with the patient. The method also includes sending configuration data to the patient device to configure the patient device to be compatible with a video conference service in response to receiving the indication that the patient is assigned to the patient device. The method also includes generating video conference credentials for the patient in response to configuring the patient device. The video conference credentials enable an auto join link that is usable by a third party device to establish a video conference with the patient through the video conference service. The method also includes sending the video conference credentials to the third party device.

In another particular aspect, a computer system includes a mobile device management (MDM) server configured to receive an indication that a patient is assigned to a patient device. The patient device stores healthcare information associated with the patient. The MDM server is also configured to send configuration data to the patient device to configure the patient device to be compatible with a video conference service in response to receiving the indication that the patient is assigned to the patient device. The MDM server is further configured to generate video conference credentials for the patient in response to configuring the patient device. The video conference credentials includes an auto-join link that is usable by a third party device to establish a video conference with the patient through the video conference service on the patient device. The MDM server is also configured to send the video conference credentials to the third party device.

In another particular aspect, a computer-readable storage device stores instructions that, when executed by a processor, cause the processor to perform operations. The operations include receiving an indication that a patient is assigned to a patient device. The patient device stores healthcare information associated with the patient. The operations also include sending configuration data to the patient device to configure the patient device to be compatible with a video conference service in response to receiving the indication that the patient is assigned to the patient device. The operations further include generating video conference credentials for the patient in response to configuring the patient device. The video conference credentials include an auto join link that is usable by a third party device to establish a video conference with the patient through the video conference service on the patient device. The operations also include sending the video conference credentials to the third party device.

In another particular aspect, a method includes sending, from a healthcare provider device to a mobile device management (MDM) server, an indication that a patient is assigned to a patient device. The patient device stores healthcare information associated with the patient. Access to the healthcare information is isolated form the MDM server, and access to the healthcare information is available to the healthcare provider device. The method also includes receiving video conference credentials for the patient in response to sending the indication. The video conference credentials enable an auto join link that is usable by a third party associated with the healthcare provider device to establish a video conference with the patient through a video conference service on the patient device. The method also includes sending an indication to a video conferencing server that the auto-join link has been clicked. The video conferencing server initiates the video conference between the healthcare provider device and the patient device in response receiving the indication.

Other aspects, advantages, and features of the present disclosure will become apparent after review of the entire application, including the following sections: Brief Description of the Drawings, Detailed Description, and the Claims.

V. DETAILED DESCRIPTION

Figure 1:
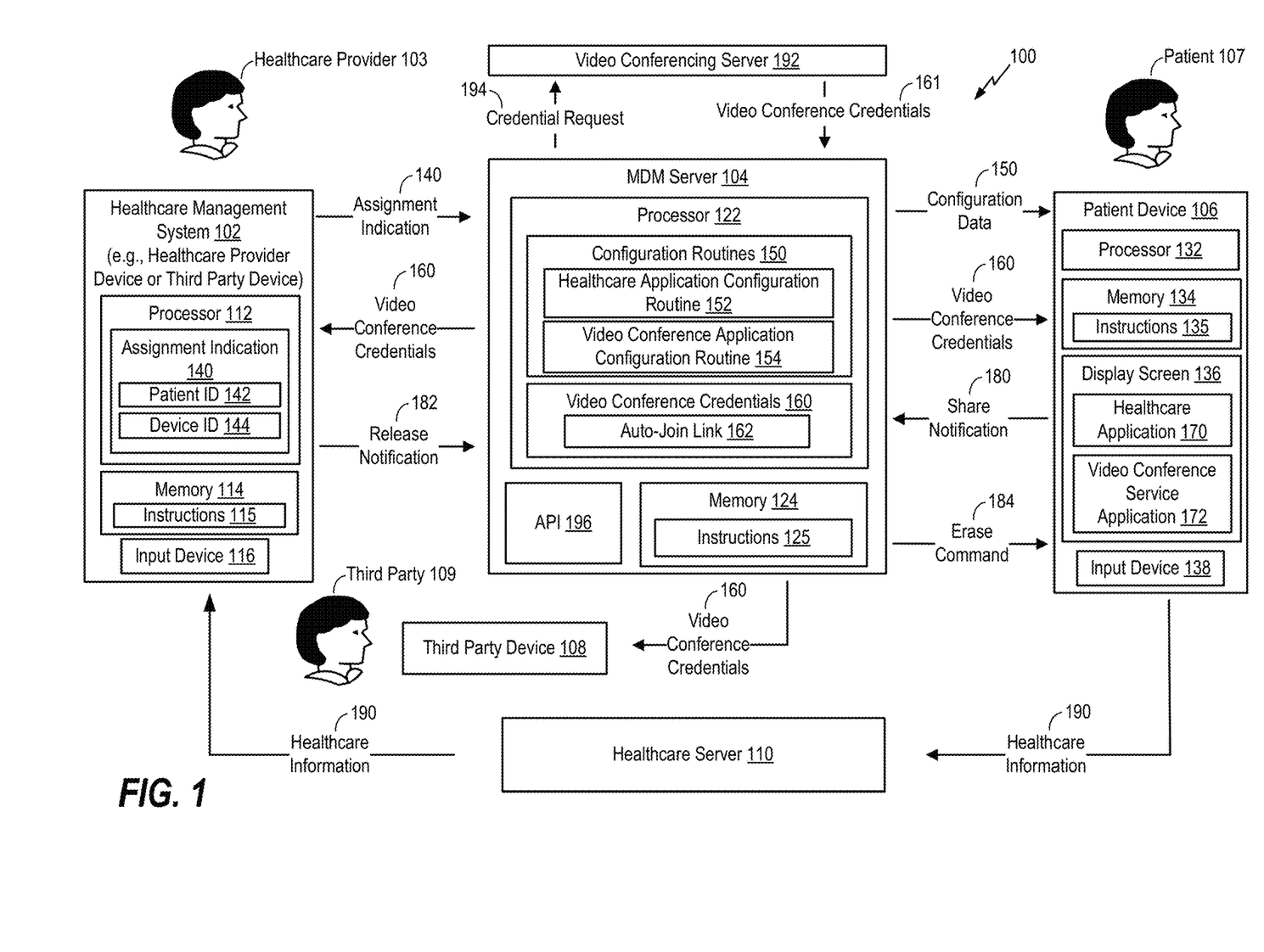
FIG. 1 is a block diagram of a particular illustrative aspect of a system operable to perform mobile device management.

Referring to FIG. 1, a system is shown and generally designated 100. The system 100 (e.g., a computer system) includes a healthcare management system 102, a mobile device management (MDM) server 104, a patient device 106, a third party device 108, a healthcare server 110, and a video conferencing server 192.

The healthcare management system 102 can be located in a healthcare facility. For example, the healthcare management system 102 can be integrated into a computing device that is located in a hospital, a clinic, a doctor's office, etc. The healthcare management system 102 is accessible to healthcare professionals at the healthcare facility. As a non-limiting example, the healthcare management system 102 is accessible to a healthcare provider 103. The healthcare provider 103 can be a doctor, a nurse, a nurse technician, etc. The healthcare management system 102 includes a processor 112, a memory 114, and an input device 116. The memory 114 can be a non-transitory computer-readable storage device that stores instructions 115 that are executable by the processor 112. The input device 116 can include a keyboard, a touchscreen, an audio input, or any other input that enables the healthcare provider 103 to provide an input to the healthcare management system 102.

The MDM server 104 includes a processor 122, a memory 124, and an application programming interface (API) 196. The memory 124 can be a non-transitory computer-readable storage device that stores instructions 125 that are executable by the processor 122. As described below, the MDM server 104 is operable to configure patient devices to support virtual visits between a patient and a healthcare provider, between a patient and a family member, and between a patient and a friend. Communications (e.g., messages, requests, etc.) between the MDM server and other devices (e.g., the healthcare management system 102, the patient device 106, the healthcare server 110, and the video conferencing server 192) can be achieved through the API 196. For example, the API 196 can receive commands from the processor 122, translate the commands to the proper format, and send the commands to the designated device. Additionally, API 196 can receive commands from other devices, translate the commands, and provide the commands to the processor 122.

The patient device 106 can be a mobile device that is owned by the healthcare facility or by personnel (e.g., the healthcare provider 103) associated with the healthcare facility. The patient device 106 can be a mobile phone, a tablet, a laptop, or any other mobile device. The patient device 106 is accessible to a patient 107. As described below, the patient device 106 can be assigned to the patient 107 by the healthcare management system 102 to support virtual patient visits. The patient device 106 includes a processor 132, a memory 134, a display screen 136, and an input device 138. The memory 134 can be a non-transitory computer-readable storage device that stores instructions 135 that are executable by the processor 132. The input device 138 can include a keyboard, a touchscreen, an audio input, or any other input that enables the patient 107 to provide an input to the patient device 107.

In certain scenarios, the healthcare provider 103 may determine that it is not advisable for the patient 107 to enter into the healthcare facility for treatment or for a check-up. As a non-limiting example, during a global pandemic based on a highly contagious and dangerous virus, the healthcare provider 103 may advise the patient 107 to remain at home and participate in a virtual visit.

In this scenario, the healthcare provider 140 can assign the patient device 106 to the patient 107. For example, the healthcare provider 103 can use the input device 116 of the healthcare management system 102 to enter a patient identifier (ID) 142 of the patient 107 and a device ID 144 of the patient device 106. The patient ID 142 include a name the patient 107, a social security number of the patient 107, a birthdate of the patient 107, any other identifying information associated with the patient 107, or a combination thereof. The device ID 144 can include a serial number of the patient device 106 or any other means used to identify the patient device 106. The processor 112 is configured to generate an assignment indication 140 based on the patient ID 142 and the device ID 144. For example, the assignment indication 140 indicates that the patient 107 is assigned to the patient device 106. The assignment indication 140 can be logged at the healthcare management system 102 so that the healthcare provider 103 can readily identify which patient is assigned a corresponding patient device. The healthcare management system 102 is configured to send the assignment indication to the MDM server 104. Additionally, the healthcare facility can ship the patient device 106 to the patient 107 after the assignment.

The MDM server 104 is operable to configure the patient device 106 to support virtual visits in response to receiving the assignment indication 140 from the healthcare management system 102. For example, the MDM server 104 is operable to configure the patient device 106 to include a healthcare application 170 for use in communicating healthcare information 190 to the healthcare provider 103 via the healthcare server 110. To illustrate, the processor 122 generates configuration routines 150 that are sent to the patient device 106 to configure the patient device 106. The configuration routines 150 include a healthcare application configuration routine 152 associated with the healthcare application 170. For example, the healthcare application configuration routine 152 includes installation routines and instructions that can be executed by the processor 132 of the patient device 106 to install the healthcare application 170 at the patient device 106. Upon sending the healthcare application configuration routine 152 to the patient device 106, the MDM server 104 can send a command to the processor 132 of the patient device 106 to run the corresponding routines and instructions to install the healthcare application 170.

In some implementations, the healthcare application configuration routine 152 is specific to the patient 107. To illustrate, the assignment indication 140 can include data that indicates a purpose for the virtual visit between the healthcare provider 103 and the patient 107. As a non-limiting example, the assignment indication 140 can include data that instructs the MDM server 104 to configure the patient device 106 for a routine check-up. In this scenario, the healthcare application configuration routine 152 can include installation routines and instructions for installing a version of the healthcare application 170 that is used for routine check-ups. As another non-limiting example, the assignment indication 140 can include data that instructs the MDM server 104 to configure the patient device 106 for a sick visit. In this scenario, the healthcare application configuration routine 152 can include installation routines and instructions for installing a version of the healthcare application that is used for sick visits.

The MDM server 104 is also operable to configure the patient device 106 to include a video conference service application 172 for the patient 107 to use for video conferencing purposes. To illustrate, the configuration routines 150 include a video conference application configuration routine 154 associated with the video conference service application 172. For example, the video conference application configuration routine 154 includes installation routines and instructions that can be executed by the processor 132 of the patient device 106 to install the video conference service application 172 at the patient device 106. Upon sending the video conference application configuration routine 154 to the patient device 106, the MDM server 104 can send a command to the processor 132 of the patient device 106 to run the corresponding routines and instructions to install the video conference service application 172.

In some scenarios, the configuration routines 150 include instructions, that when executed by the processor 132 of the patient device 106, configures the patient device 106 to include a shortcut to the healthcare application 170 and a shortcut to the video conference service application 172. For example, upon command by the MDM server 104 the processor 132 can execute the configuration routines 150 such that the healthcare application 170 and the video conference service application 172 are presented on a home screen of the patient device 106.

The healthcare application 170 can prompt the patient 107 to enter healthcare information 190. For example, the patient 107 can use the input device 138 to answer different questions associated with the purpose of the virtual visit. As referenced above, the questions for a routine check-up in one version of the healthcare application 170 can be different from the questions for a sick visit in another version of the healthcare application 170. For example, questions for the routine check-up version of the healthcare application 170 can be directed to the weight of the patient 107, the heartrate of the patient 107, etc. However, questions for the sick visit version the healthcare application 170 can be directed to describing symptoms experienced by the patient 107.

The processor 132 is configured to send the healthcare information 190 (e.g., the answer to the questions) to a healthcare server 110 associated with the healthcare facility, and the healthcare server 110 is configured to send the healthcare information 190 to the healthcare management system 102. As a result, the healthcare provider 103 can access the healthcare information 190 of the patient 107, and the healthcare information 190 is isolated from the MDM server 104. Thus, sensitive healthcare information 190 is protected and patient-provider confidentiality can be maintained.

The MDM server 104 is also configured to generate video conference credentials 160 for the video conference service application 172 in response to configuring the patient device 106. The video credentials 160 include a video conference code and an associated password that are embedded into an auto join link 162. To generate the video conference credentials 160, specifically the auto join link 162, the MDM server 104 sends a credential request 194 to the video conferencing server 192. The credential request 194 includes a request for the video conference code and the associated password. The video conference server 192 sends video conference credentials 161 to the MDM server 104. The video conference credentials 161 include the video conference code and the associated password; however, the video conference credentials 161 do not include the auto-join link 162. The processor 122 of the MDM server 104 embeds the video conference code and the associated password into the auto-join link 162 to generate the video conference credentials 160. A device having access to the video conference service application 172 can click the auto join link 162 to join a video conference associated with the video conference code. Thus, when clicked, the auto-join link 162 enables a party to join the video conference associated with the video conference code without having to manually enter the video conference code and password. The MDM server 104 sends the video conference credentials 160 to the patient device 106 to provide the patient 107 with the auto join link 162.

Additionally, the MDM server 104 sends the video conference credentials 160 to the healthcare management system 102. As a result, the healthcare provider 103 can click the auto join link 162 to enter into the video conference with the patient 107. As a result, the patient 107 and the healthcare provider 103 can participate in a virtual visit (e.g., the video conference) through the video conference service application 172 without having to enter login information (e.g., the video conference code and the password).

In some scenarios, the video conference credentials 160 are shared with the healthcare provider 103 in response to a share notification 180 received from the patient device 106. For example, the patient 107 can use the input device 138 to list participants for a video conference using the video conference service application 172. Based on the list, the processor 132 generates the share notification 180 and sends the share notification 180 to the MDM server 104. The MDM server 104 identifies the participants for the video conference in the share notification 180 and sends the video conference credentials 160 (e.g., the auto join link 162) to the participants. For example, as illustrated in FIG. 1, the MDM server 104 sends the video conference credentials 160 to the healthcare management system 102 associated with the healthcare provider 103 and to the third party device 108 associated with the third party 109.

According to one implementation, the third party 109 can be a friend of the patient 107, a family member of the patient 107, etc. Thus, not only can the techniques described herein be used to establish a patient-provider video conference without the need to enter login information (e.g., the video conference code and password), the techniques described herein can also be used to establish a video conference with friends and family without the need to enter login information. As a result, if the patient 107 is highly contagious, friends and family can communicate with the patient 107 through the video conference service application 172 while the patient 107 remains quarantined at home or while the patient 107 remains in a portion of the healthcare facility that does not allow visitation. Additionally, based on the consent of the patient 107 (e.g., the share notification 180), friends and family of the patient 107 can join the virtual conference between the patient 107 and the healthcare provider 103.

In response to receiving a notification that at least one of the healthcare provider 103, the patient 107, or the third party 109 clicked the auto-join link 162, the video conferencing server 192 can initiate a video conference connection through the video conference service application 172. Additional members can join the video conference in response to clicking the auto join link 162. As a non-limiting example, the healthcare provider 103 and the patient 107 can click the auto join link 162, and as a result, the video conferencing server 192 can establish the video conference between the healthcare provider 103 and the patient 107. If the third party 109 subsequently clicks the auto-join link 162, the third party 109 can be joined into the video conference between the healthcare provider 103 and the patient 107.

After treatment or after the video conference, the healthcare provider 103 can use the input device 116 to indicate that the patient 107 is released or discharged. The processor 112 is configured to generate a release notification 182 that the patient 107 is no longer assigned to the patient device 106. In response to receiving the release notification 182, the MDM server 104 is configured to send an erase command 184 to the patient device 106 to erase the healthcare information associated with the patient 107 from the patient device 106 and to erase the video conference credentials 160 from the patient device 106. According to one implementation, the healthcare application 170 and the video conference service application 172 are uninstalled from the patient device 106 in response to receiving the erase command 184. According to one implementation, the erase command 184 corresponds to a reset command that reset the patient device 106 to a factory setting.

The techniques described with respect to FIG. 1 enable the patient 107 and the healthcare provider 103 to have virtual conferences through the video conference service application 172. The patient 107 and the healthcare provider 103 can bypass the requirement to manually enter the login information (e.g., the video conference code and the password) to join the virtual conference because MDM server 104 embeds login information into the audio-join link 162. It should be also appreciated that the healthcare information 190 submitted to the healthcare provider 103 is isolated from the MDM server 104 to promote provider-patient confidentiality.

Figure 2:
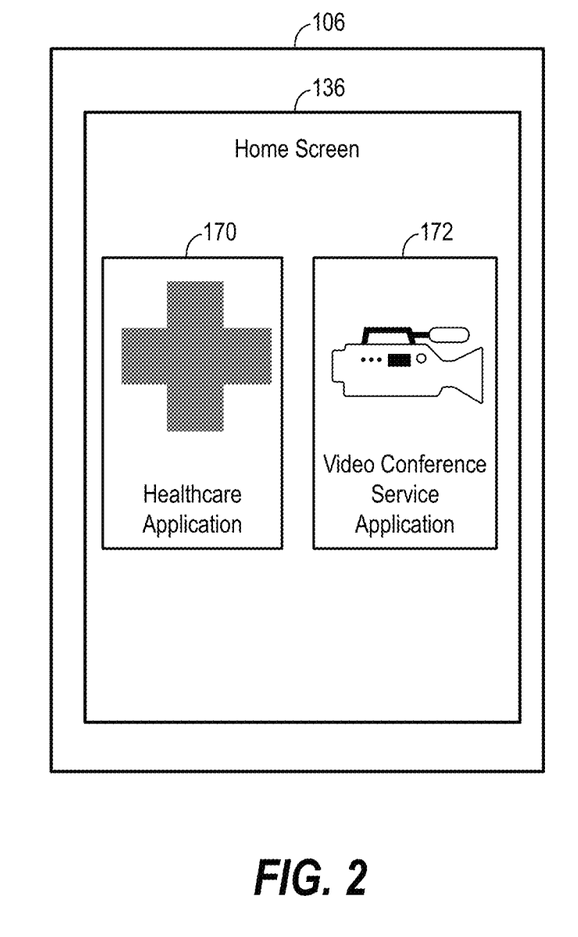
FIG. 2 is a diagram of a patient device configured by a mobile device management (MDM) server.

FIG. 2 is a diagram of the patient device 106 configured by the MDM server 104. The patient device 106 includes the display screen 136. According to some implementations, the display screen 136 includes touch-screen functionality such that the patient 107 can use a finger for interaction.

In FIG. 2, a home screen is displayed on the display screen 136. A shortcut to the healthcare application 170 and a shortcut to the video conference service application 172 is displayed on the home screen. As described above, in response to receiving the assignment indication 140, the MDM server 104 configures the patient device 106 to present the shortcuts to the healthcare application 170 and the video conference service application 172 on the home screen. The patient 107 can use the input device 138 or a finger to select the applications 170, 172.

Figure 3A:
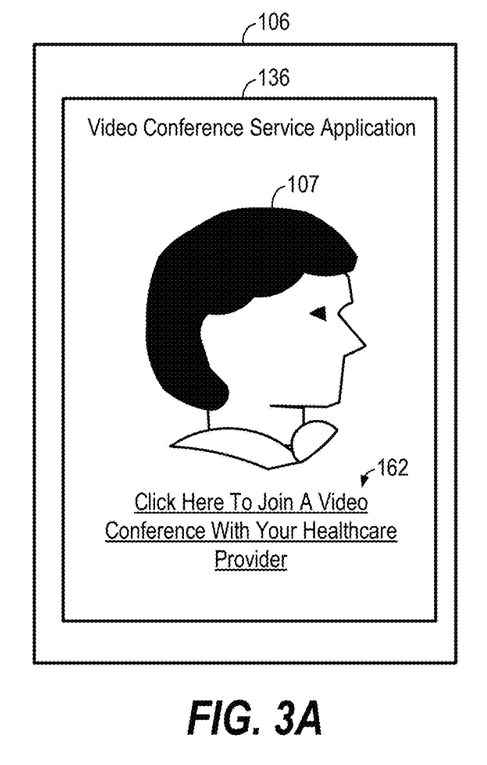
FIG. 3A is a diagram of an activated video conference application on a patient device.

FIG. 3A is a diagram of an activated video conference service application 172 on the patient device 106. In FIG. 3A, live video of the patient 107 is displayed within the video conference service application 172. Additionally, the auto join link 162 is displayed within the video conference service application 172. In the illustrated example of FIG. 3A, the auto-join link 162 is a hyper-link that states "Click Here To Join A Video Conference With Your Healthcare Provider." It should be noted that the auto join link 162 is merely for illustrative purposes and should not be construed as limiting. The video conference code and the password are embedded into the auto join link 162 so that, upon a user click, the patient 107 is entered into the video conference.

Figure 3B:
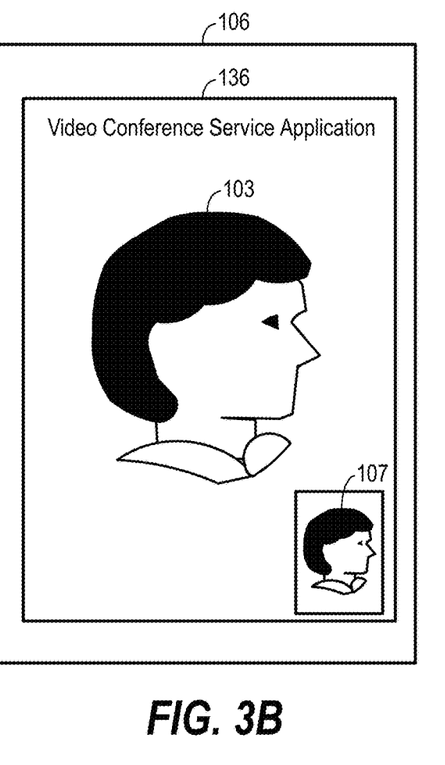
FIG. 3B is a diagram of a virtual visit between a patient and a healthcare provider through a video conference service application on a patient device.

FIG. 3B is a diagram of a virtual visit between the patient 107 and the healthcare provider 103 through the video conference service application 172 on the patient device 106. The virtual visit between the patient 107 and the healthcare provider 103 is established when both parties 103, 107 click the auto-join link 162. Thus, the patient 107 and the healthcare provider 103 can have a virtual consultation without having to enter the login information (e.g., the video conference code and the password). It should further be appreciated that, for the virtual consultation, the healthcare provider 103 has access to the healthcare information 190 of the patient 107 through a secure server (e.g., the healthcare server 110) that is isolated from the MDM server 104 and the video conference service application 172.

Figure 3C:
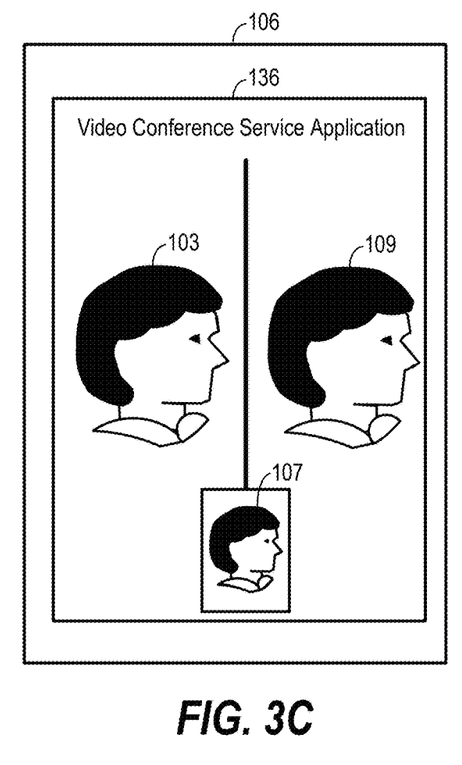
FIG. 3C is a diagram of a virtual visit between a patient, a healthcare provider, and a third party through a video conference service application on a patient device.

FIG. 3C is a diagram of a virtual visit between the patient 107, the healthcare provider 103, and the third party 109 through the video conference service application 172 on the patient device 106. In the illustrative example of FIG. 3C, the third party 109 joins the virtual consultation by clicking the auto join link 162. Thus, the third party 109 can join the virtual visit between the healthcare provider 103 and the patient 107 without having to enter the login information (e.g., the video conference code and the password).

It should be appreciated that the techniques described with respect to FIGS. 3A-3C enable the patient 107 to be virtually visited in scenarios where the patient 107 is advised to be isolated from the public. For example, if the patient 107 is highly contagious or there is a global pandemic, it may not be advisable for the patient 107 to visit a healthcare facility. The techniques described herein enable the patient 107 to remain at home and still receive quality healthcare from the healthcare provider 103.

Figure 4A:
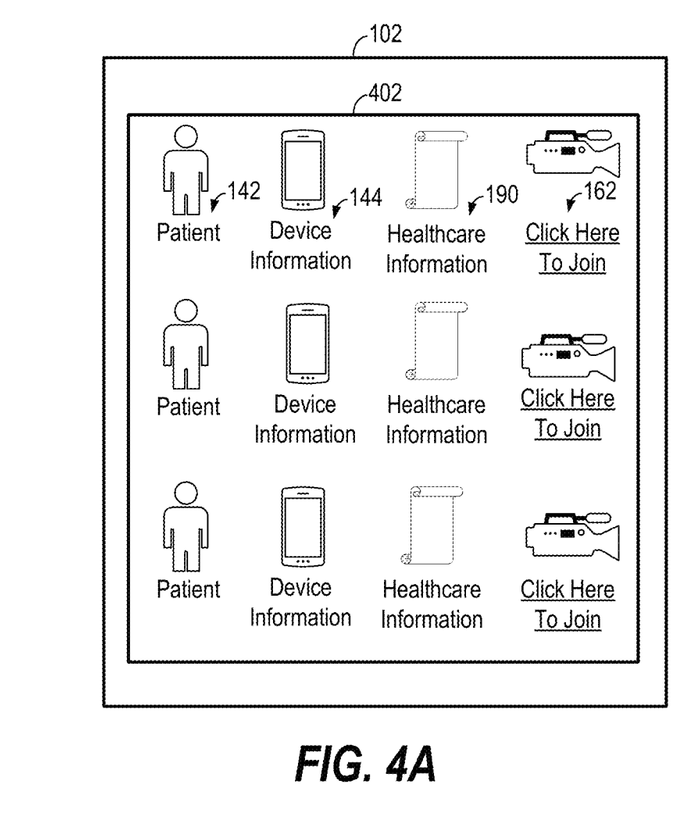
FIG. 4A is a diagram of a data log displayed on a screen of a healthcare management system.

FIG. 4A is a diagram of a data log displayed on a screen 402 of the healthcare management system 102. The data log include multiple entries. The screen 402 can be an interactive touch screen that allows the healthcare provider 103 to select different options for a given entry.

Each entry indicates a patient, device information assigned to the patient, healthcare information of the patient, and an auto join link to join a video conference with the patient. To illustrate, a first entry indicates that the patient ID 142 of the patient 107, the device ID 144, the healthcare information of the patient 190, and the auto join link 162. The healthcare provider 103 can select the option to review the healthcare information 190 (e.g., the answers to the healthcare questions) provided by the patient 107 through the healthcare server 110. Additionally, the healthcare provider 103 can click the auto join link 162 to join the video conference with the patient 107.

According to one implementation, the healthcare provider 103 can select the device ID 144 option and, based on a sub-selection (not shown), can release the patient device 106 from the patient 107. In response to releasing the patient device 106 from the patient 107, the healthcare management system 102 sends the release notification 182 to the MDM server 104, and the MDM server 104 sends the erase command 184 to the patient device 184 to erase the healthcare information 190.

Figure 4B:
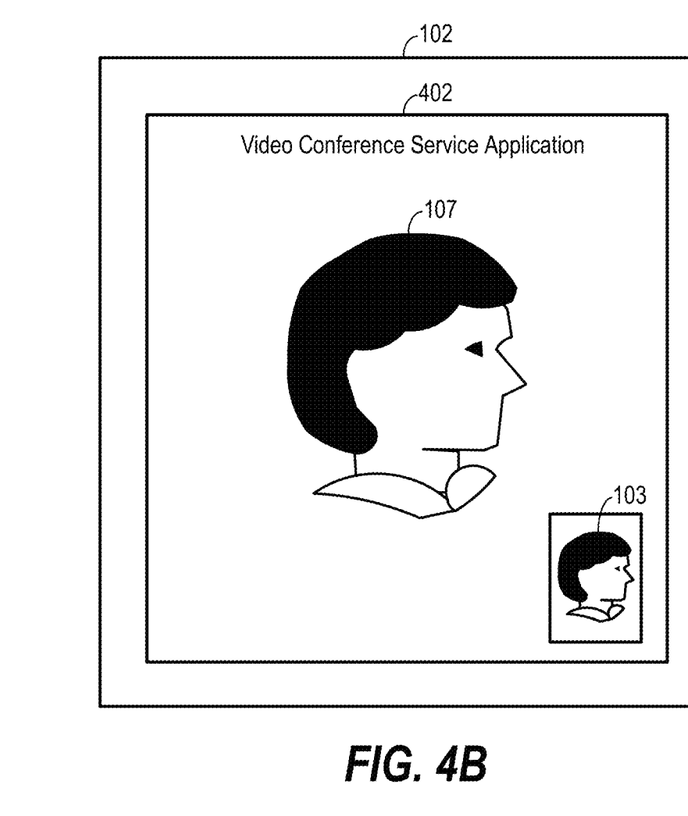

FIG. 4B is a diagram of a virtual visit between the patient 107 and the healthcare provider 103 through the video conference service application 172 on the healthcare management system 102. The virtual visit between the patient 107 and the healthcare provider 103 is established when both parties 103, 107 click the auto join link 162. Thus, the patient 107 and the healthcare provider 103 can have a virtual consultation without having to enter the login information (e.g., the video conference code and the password).

It should further be appreciated that, for the virtual consultation, the healthcare provider 103 has access to the healthcare information 190 of the patient 107 through a secure server (e.g., the healthcare server 110) that is isolated from the MDM server 104 and the video conference service application 172.

It should be appreciated that the techniques described with respect to FIGS. 4A-4B enable the healthcare provider 103 to be virtually visit the patient 107 in scenarios where the patient 107 is advised to be isolated from the public. For example, if the patient 107 is highly contagious or there is a global pandemic, it may not be advisable for the patient 107 to visit a healthcare facility. The techniques described herein enable the patient 107 to remain at home and still receive quality healthcare from the healthcare provider 103.

Figure 5:
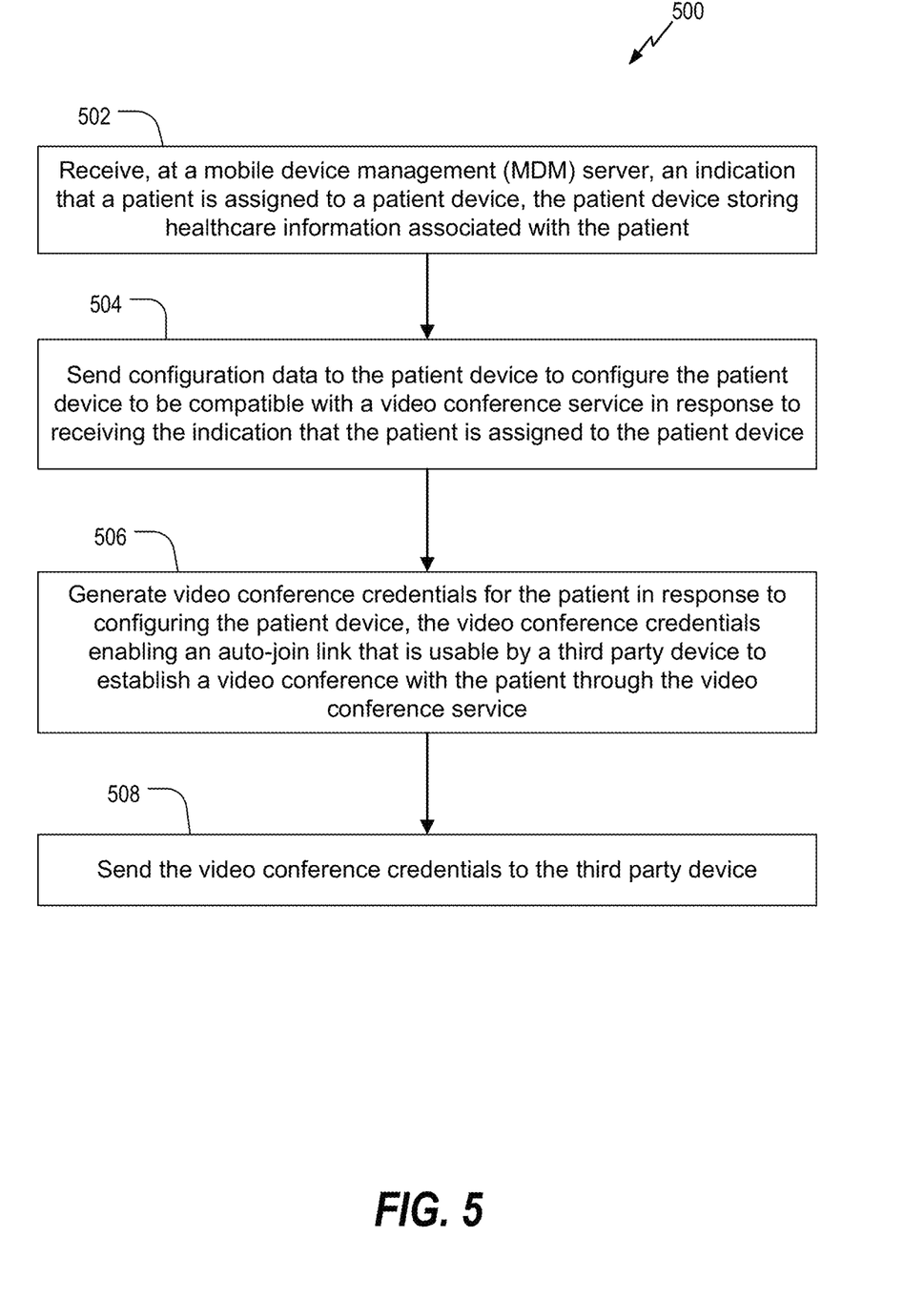
FIG. 5 is a flow chart of a method of mobile device management.

Referring to FIG. 5, a method of mobile device management is shown and generally designated 500. The method 500 may be performed by the MDM server 104 of FIG. 1.

The method 500 includes receiving, at a MDM server, an indication that a patient is assigned to a patient device, at 502. The patient device stores healthcare information associated with the patient. For example, referring to FIG. 1, the MDM server 104 receives the indication 140 that the patient 107 is assigned to the patient device 106. The patient device 106 stores the healthcare information 190 associated with the patient 107. According to one implementation of the method 500, the indication that the patient 106 is assigned to the patient device 106 is based on a message received from a third party, such as a message received from the healthcare provider 103.

The method 500 also includes sending configuration data to the patient device to configure the patient device to be compatible with a video conference service in response to receiving the indication that the patient is assigned to the patient device, at 504. For example, referring to FIG. 1, the MDM server 104 sends the configuration data 150 to the patient device 106 to configure the patient device 106 to be compatible with the video conference service in response to receiving the indication 140.

According to one implementation of the method 500, configuring the patient device 106 to be compatible with the video conference service includes installing an application (e.g., the video conference service application 172) associated with the video conference service on the patient device 106. Configuring the patient device 106 can also include creating a shortcut at the patient device 106 to enable the patient 07 to access the video conference service through the application via single click. For example, as illustrated in FIG. 2A, the shortcut can be on the home screen of the patient device 106.

The method 500 also includes generating video conference credentials for the patient in response to configuring the patient device, at 506. The video conference credentials enable an auto join link that is usable by a third party device to establish a video conference with the patient through the video conference service. For example, referring to FIG. 1, the MDM server 104 generates the video conference credentials 160 in response to configuring the patient device 106 with the video conference service application 172. The video conference credentials includes the auto join link 162 that is usable by parties 103, 107, 109 to establish or join a video conference.

According to one implementation of the method 500, generating the video conference credentials includes sending a credential request to a video conferencing server. For example, referring to FIG. 1, to generate the video conference credentials 160, specifically the auto-join link 162, the MDM server 104 sends the credential request 194 to the video conferencing server 192. The credential request 194 includes a request for the video conference code and the associated password. Generating the video conference credentials can also include receiving the video conference code and the password from the video conferencing server. For example, referring to FIG. 1, the video conference server 192 sends video conference credentials 161 to the MDM server 104. The video conference credentials 161 include the video conference code and the associated password; however, the video conference credentials 161 do not include the auto-join link 162. Generating the video conference credentials can also include embedding the video conference code and the password into the auto join link. For example, referring to FIG. 1, the processor 122 of the MDM server 104 embeds the video conference code and the associated password into the auto join link 162 to generate the video conference credentials 160.

The method 500 also includes sending the video conference credentials to the third party device, at 508. For example, referring to FIG. 1, the MDM server 104 sends the video conference credentials 160 to the healthcare management system 102 associated with the healthcare provider 103 and to the third party device 108 associated with the third party 109.

According to one implementation, the method 500 includes receiving a notification that the patient selected an option to share the video conference credentials with the third party, and the video conference credentials are sent to the third party conditioned on receiving the notification. For example, referring to FIG. 1, the MDM server receives the share notification 180 indicating the parties 103, 109 in which to share the video conference credentials 160. According to this implementation, the video conference credentials 160, and thus the auto join link 162, are sent to the other parties 103, 109 conditioned on the MDM server 104 receiving the share notification 180.

According to the method 500, the video conference between the third party and the patient is initiated without prompting the third party to enter login information. For example, the third party is not prompted to enter a video conference code or a password.

According to different implementations of the method 500, the third party can be a healthcare provider, a friend of the patient, a family member of the patient, or another party. The patient device can be located in a facility associated with the healthcare provider or can be remotely located from the facility associated with the healthcare provider. According to one implementation, the patient device is owned by the healthcare provider.

According to one implementation of the method 500, access to the healthcare information 190 is isolated from the MDM server 104. Additionally, the healthcare information 190 can be isolated from the video conference credentials 160 to ensure provider-patient confidentiality.

According to one implementation, the method 500 also includes receiving a notification that the patient is no longer assigned to the patient device. For example, referring to FIG. 1, the MDM server 104 receives the release notification that the patient 107 is no longer assigned to the patient device 106. The method 500 can also include sending a command to the patient device to erase the healthcare information associated with the patient and the video conference credentials in response to receiving the notification. For example, referring to FIG. 1, the MDM server 104 sends the erase command to the patient device 106 to erase the healthcare information 190 associated with the patient 107 an the video conference credentials 160. According to one implementation, the command (e.g., the erase command 184) corresponds to a reset command that resets the patient device 106 to a factory setting.

The method 500 of FIG. 5 enables the patient 107 and the healthcare provider 103 to have virtual conferences through the video conference service application 172. The patient 107 and the healthcare provider 103 can bypass the requirement to manually enter the login information (e.g., the video conference code and the password) to join the virtual conference because MDM server 104 embeds login information into the audio join link 162. It should be also appreciated that the healthcare information 190 submitted to the healthcare provider 103 is isolated from the MDM server 104 to promote provider-patient confidentiality.

Figure 6:
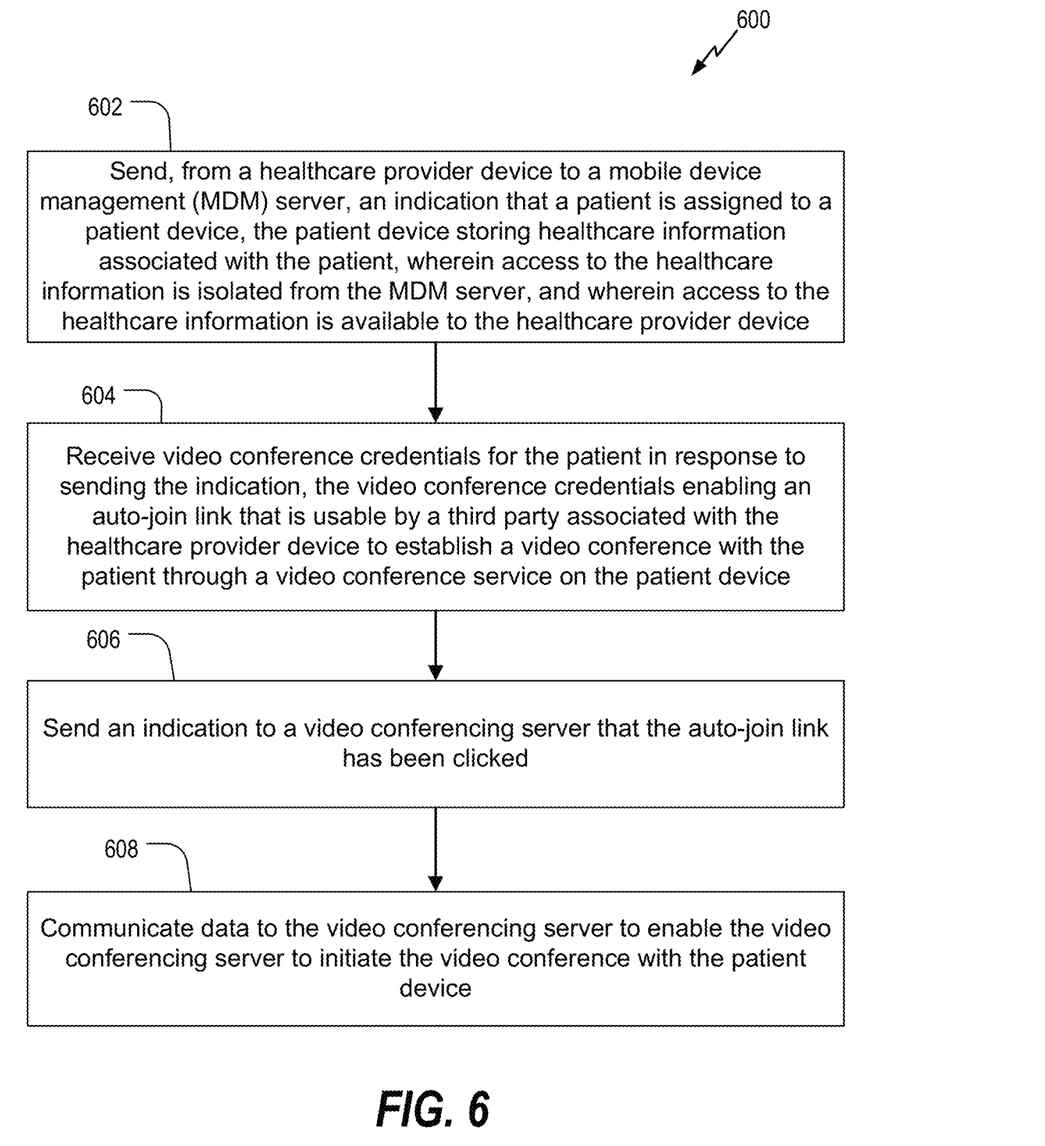
FIG. 6 is a flow chart of a method, according to an example embodiment.

Referring to FIG. 6, a method is shown and generally designated 600. The method 600 may be performed by the healthcare management system 102 of FIG. 1.

The method 600 includes sending, from a healthcare provider device to a MDM server, an indication that a patient is assigned to a patient device, at 602. The patient device stores healthcare information associated with the patient. Access to the healthcare information is isolated from the MDM server, and access to the healthcare information is available to the healthcare provider device.

The method 600 also includes receiving video conference credentials for the patient in response to sending the indication, at 604. The video conference credentials enable an auto join link that is usable by a third party associated with the healthcare provider device to establish a video conference with the patient through a video conference service on the patient device.

The method 600 further includes sending an indication to a video conferencing server that the auto join link has been clicked, at 606. The method 600 also includes communicating data to the video conferencing server to enable the video conferencing server to initiate the video conference with the patient device, at 608.

Although one or more of FIGS. 1-6 may illustrate systems, devices, and/or methods according to the teachings of the disclosure, the disclosure is not limited to these illustrated systems, devices, and/or methods. Aspects of the disclosure may be suitably employed in any device that includes integrated circuitry including memory, a processor, and on-chip circuitry.

One or more functions or components of any of FIGS. 1-6 as illustrated or described herein may be combined with one or more other portions of another of FIGS. 1-6. Accordingly, no single aspect described herein should be construed as limiting and aspects of the disclosure may be suitably combined without departing form the teachings of the disclosure.

Those of skill would further appreciate that the various illustrative logical blocks, configurations, modules, circuits, and algorithm steps described in connection with the aspects disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the aspects disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium (e.g., a computer-readable storage device) is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal. A storage device is not a signal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A method comprising:

receiving, at a mobile device management (MDM) server, an indication that a patient is assigned to a patient device, the patient device storing healthcare information associated with the patient, wherein the indication that the patient is assigned to the patient device is based on a message received from a third party device;

sending, from the MDM server, configuration data to the patient device configuring the patient device to be compatible with a video conference service in response to receiving the indication that the patient is assigned to the patient device;

generating, at the MDM server, video conference credentials for the patient in response to configuring the patient device, the video conference credentials enabling an auto-join link that is utilized by the third party device in establishing a video conference with the patient through the video conference service on the patient device;

sending, from the MDM server, the video conference credentials to the third party device;

receiving, at the MDM server, a notification that the patient is no longer assigned to the patient device; and sending, from the MDM server, a command to the patient device erasing the healthcare information associated with the patient and the video conference credentials in response to receiving the notification.

2. The method of claim 1, wherein access to the healthcare information is isolated from the MDM server, and wherein the healthcare information is isolated from the video conference credentials.

3. The method of claim 1, wherein configuring the patient device to be compatible with the video conference service comprises:

installing an application associated with the video conference service on the patient device;
configuring the application; and
creating a shortcut at the patient device enabling the patient to access video conference service through the application via a single click.

4. The method of claim 1, wherein generating video conference credentials comprises:
sending a credential request to a video conferencing server;
receiving a video conference code and a password from the video conferencing server; and
embedding the video conference code and the password into the auto join link.

5. The method of claim 1, wherein the command corresponds to a reset command that resets the patient device to a factory setting.

6. The method of claim 1, further comprising receiving, at the MDM server, a second notification that the patient selected an option to share the video conference credentials with the third party device, wherein the video conference credentials are sent to the third party device conditioned on receiving the second notification.

7. The method of claim 1, wherein the video conference between the third party device and the patient device is initiated without prompting the patient device to enter login information.

8. The method of claim 1, wherein the video conference between the third party device and the patient device is initiated without prompting the third party device to enter login information.

9. The method of claim 1, wherein the third party device is a healthcare provider device.

10. The method of claim 9, wherein the patient device is located in a facility associated with the healthcare provider.

11. The method of claim 9, wherein the patient device is remotely located from a facility associated with the healthcare provider.

12. The method of claim 9, wherein the patient device is owned by the healthcare provider.

13. The method of claim 1, wherein the third party device is associated with one of a friend of the patient or a family member of the patient.

14. A computer system comprising:
a mobile device management (MDM) computer server configured to:
receive an indication that a patient is assigned to a patient computing device, the patient computing device storing healthcare information associated with the patient, wherein the indication that the patient is assigned to the patient computing device is based on a message received from a third party computing device;
send configuration data to the patient computing device to configure the patient computing device to be compatible with a video conference service in response to receiving the indication that the patient is assigned to the patient computing device;
generate video conference credentials for the patient in response to configuring the patient computing device, the video conference credentials including an auto-join link that is utilized by the third party computing device to establish a video conference with the patient through the video conference service on the patient computing device;
send the video conference credentials to the third party computing device;
receive a notification that the patient is no longer assigned to the patient computing device; and
send a command to the patient computing device erasing the healthcare information associated with the patient and the video conference credentials in response to receiving the notification.

15. The computer system of claim 14, wherein access to the healthcare information is isolated from the MDM computer server, and wherein the healthcare information is isolated from the video conference credentials.

16. A computer-readable storage device storing instructions that, when executed by a processor, cause the processor to perform operations comprising:
receiving, at a mobile device management (MDM) server, an indication that a patient is assigned to a patient device, the patient device storing healthcare information associated with the patient, wherein the indication that the patient is assigned to the patient device is based on a message received from a third party device;
sending, from the MDM server, configuration data to the patient device configuring the patient device to be compatible with a video conference service in response to receiving the indication that the patient is assigned to the patient device;
generating, at the MDM server, video conference credentials for the patient in response to configuring the patient device, the video conference credentials including an auto-join link that is utilized by the third party device in establishing a video conference with the patient through the video conference service on the patient device;
sending, from the MDM server, the video conference credentials to the third party device;
receiving, at the MDM server, a notification that the patient is no longer assigned to the patient device; and
sending, from the MDM server, a command to the patient device erasing the healthcare information associated with the patient and the video conference credentials in response to receiving the notification.

17. The computer-readable storage device of claim 16, wherein generating video conference credentials comprises:
sending a credential request to a video conferencing server;
receiving a video conference code and a password from the video conferencing server; and
embedding the video conference code and the password into the auto join link.

* * * * *